(12) United States Patent
Howard

(10) Patent No.: US 6,806,863 B1
(45) Date of Patent: Oct. 19, 2004

(54) BODY-MOUNTED SELECTIVE CONTROL DEVICE

(75) Inventor: Robert Bruce Howard, Manassas, VA (US)

(73) Assignee: Harmonic Research, Inc., Sudley Springs, VA (US)

( * ) Notice: Subject to any disclaimer, the term of this patent is extended or adjusted under 35 U.S.C. 154(b) by 168 days.

(21) Appl. No.: 09/689,659

(22) Filed: Oct. 13, 2000

Related U.S. Application Data

(60) Provisional application No. 60/159,611, filed on Oct. 15, 1999, and provisional application No. 60/040,502, filed on Oct. 15, 1999.

(51) Int. Cl.[7] .................................................. G09G 5/08
(52) U.S. Cl. ...................... 345/158; 345/168; 345/169; 341/22
(58) Field of Search ............................. 345/156, 157, 345/158, 168, 169, 170, 173, 175, 863, 865; 400/479.2; 341/20–22; 600/300, 301; 434/45

(56) References Cited

U.S. PATENT DOCUMENTS

| | | | |
|---|---|---|---|
| 4,414,537 A | * | 11/1983 | Grimes ........................ 341/20 |
| 4,988,981 A | * | 1/1991 | Zimmerman et al. ....... 345/158 |
| 5,512,919 A | * | 4/1996 | Araki .......................... 345/156 |
| 5,612,689 A | * | 3/1997 | Lee, Jr. ......................... 341/20 |
| 5,796,354 A | * | 8/1998 | Cartabiano et al. ........... 341/22 |
| 5,880,712 A | * | 3/1999 | Goldman .................... 345/168 |
| 5,894,454 A | * | 4/1999 | Kondo ......................... 368/11 |
| 5,963,331 A | * | 10/1999 | Arai et al. .................. 356/613 |
| 6,097,374 A | | 8/2000 | Howard |
| 6,224,548 B1 | * | 5/2001 | Gopinathan et al. ........ 600/300 |
| 6,380,923 B1 | * | 4/2002 | Fukumoto et al. .......... 345/156 |
| 6,388,657 B1 | * | 5/2002 | Natoli ......................... 345/168 |

* cited by examiner

*Primary Examiner*—Amr Awad
(74) *Attorney, Agent, or Firm*—Greenberg Traurig, LLP; Paul F. McQuade; James E. Goepel

(57) ABSTRACT

A small, lightweight housing includes a plurality of light signal transmitters and can be attached to the body such as the wrist of an operator such that another part of the body or another object can be brought into the beam of a particular light transmitter to reflect or scatter the light signal from one of the light signal transmitters and coded such that a particular light transmitter can be distinguished. A receptor associated with the housing receives the reflected or scattered light and alters the signal applied to a light signal transmitter, such as by increase of power, increase of the number of similarly modulated light transmitters which are driven or coding such as imposition of additional modulation. A signal is then received from an optical link by an optical receptor at a base station.

22 Claims, 6 Drawing Sheets

BODY-MOUNTED SELECTIVE CONTROL DEVICE

CROSS-REFERENCE TO RELATED APPLICATIONS

This application is related to U.S. patent application Ser. No. 09/035,983, filed Mar. 6, 1998, now U.S. Pat. No. 6,097,374, claiming priority of U.S. Provisional Patent application 60/040,502, and is a continuation-in-part of U.S. Provisional Patent Application 60/159,611, both filed Oct. 15, 1999, all of which are hereby fully incorporated by reference.

BACKGROUND OF THE INVENTION

1. Field of the Invention

The present invention generally relates to portable selective data capture and selective control devices providing an interface between a user and a controlled device and, more particularly, to arrangements for providing data or control input to devices such as a data processor, musical instrument, communication device or the like while allowing freedom of movement and minimal interference with other activities for a user.

2. Description of the Prior Art

Most mechanical and electrical devices capable of multiple functions require and provide for user control for selection between those functions and initiation and termination of the function selected. In general, multiple buttons in the nature of a keypad or keyboard of arbitrary extent has been the arrangement of choice for communicating user selection and/or control to the device. In recent years, other arrangements such as pointing devices and voice-responsive systems have come into relatively widespread use. Further, some systems have provided for control and/or selection to be provided by collected data such as physiological information concerning the user. For example, eye movement or nervous system activity (e.g. EEG, EKG, blood pressure, electro-neural muscle activity and the like) can be monitored to develop signals which can be used in the same manner as key strokes for selection or control. However, alternative input arrangements have generally been implemented as stand-alone systems which are useable alone or as a supplement to keyboards in a mutually exclusive fashion.

However, keyboards are not generally well-adapted for long periods of operation by a human user and alternative arrangements such as those alluded to above generally involve some degree of inconvenience, slow response, substantial user training and accommodation and/or significant data processing resources. So-called ergonomic design features provide only marginal improvements in accommodating human use. Moreover, while some portable or wearable devices are known, they are generally dedicated to a single type of input to a single apparatus, such as the separate keyboard and mouse or other pointing arrangement of a personal computer. For example, an arrangement is known in which a rolling member such as is used in a mouse is mounted on the underside of a keyboard and pointing controlled by sliding the entire keyboard along a surface, compromising convenience of both pointing and data entry functions.

A notable exception is disclosed in the above-incorporated U.S. Pat. No. 6,097,374 granted to the inventor of the present invention. As disclosed therein, a small and lightweight housing is preferably worn on the wrist and includes a plurality of directional light-emitting devices. The housing supports a substantially linear array of directional light receptors extending generally parallel to the direction of light emission and received light substantially orthogonal thereto; thus providing a matrix of locations which can be monitored and distinguished from each other when a finger or other appendage is moved to any location in the matrix defined by the directional light emitters and receptors.

This arrangement also includes motion sensors in at least two directions for controlling a pointing device in response to hand motion (e.g. orientation, velocity and the like) for controlling a pointing arrangement or providing other input parameters such as volume or tempo to a musical instrument digital interface (MIDI) and, if desired, a microphone and associated circuitry for receiving voice or other audible signal input. All information developed by these arrangements is communicated to another device or base station such as a personal computer or musical instrument by a modulated light communication link much in the nature of a remote control arrangement for a television or other appliance.

SUMMARY OF THE INVENTION

It is therefore an object of the present invention to provide enhancements for the invention disclosed and claimed in the above-incorporated U.S. Pat. No. 6,097,379 in structure, information capture, function and adaptability to a greatly increased variety of applications.

It is another object of the invention to provide the function of the invention of U.S. Pat. No. 6,097,379 and additional functions with increased accommodation of other activities of a user.

In order to accomplish these and other objects of the invention, a system for providing an input signal to an apparatus over an electro-magnetic communication link is contemplated. The system has a base station including an electro-magnetic receiver. A housing is attachable to a body of an operator and a plurality of electro-magnetic signal transmitters are associated with the housing. A plurality of receptors are also associated with the housing and a mechanism is provided for supplying distinctive signals to each of the plurality of electro-magnetic transmitters such that reflected electro-magnetic signals can be distinguished when reflected from a body portion of the operator or another object. In addition, a mechanism is provided for modifying the distinctive signals responsive to a receptor of the plurality of signal receptors.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The present invention generally relates to an interface device which utilizes sensors and transducers to acquire and transmit data between an operator and a remote base station via wireless communications. The interface device may also be used to monitor environmental conditions as well as bio-metric conditions of an operator such as, for example, galvanic skin resistance, pulse, EKG, EEC, blood pressure, electro-neural muscle activity, audio signals from the user and the like. Although optical wireless communications are generally discussed in detail below, it should be recognized by those of skill in the art that other communications can equally be used by the present invention including terrestrial radio communications, satellite communications, sound communications and the like.

In an embodiment, the interface device of the present invention includes optical emitters and detector(s) to detect finger position and capture video images and scanned images. It should be understood by those of skill in the art that the present invention not only contemplates the use of optical emitters and detector(s) but also contemplates the use of radio, sound, magnetic or other such emitters and detector (s). The interface device may also include accelerometer(s) to detect hand motion and attitude of the hand in order to provide the functions of the present invention.

In a wireless mode, the interface device of the present invention may communicate with a local base station connected to a local host system, or to a remote host via long distance transmission. A direct link with another operator is also contemplated by the present invention using paging, 2-way audio and/or video communications or other data exchange, as discussed with greater detail with reference to the drawings. By way of illustrative example, some of the functions capable of being performed by the invention include virtual typing, computer/cursor pointing, as well as to interface with a host of other locally or remote servers. All input and control functions may be dynamically enabled or disabled by the operator, or interactively from another operator at a remote location.

It is also contemplated that the invention can provide forced feedback to the operator. This may be accomplished by the use of pressure sensors used in conjunction with forced feedback mechanical response to produce a force relative to the operator's input. By way of a specific example, electrically controlled temperature transducers may be employed to couple thermal feedback to the operator's skin.

Figure 1:
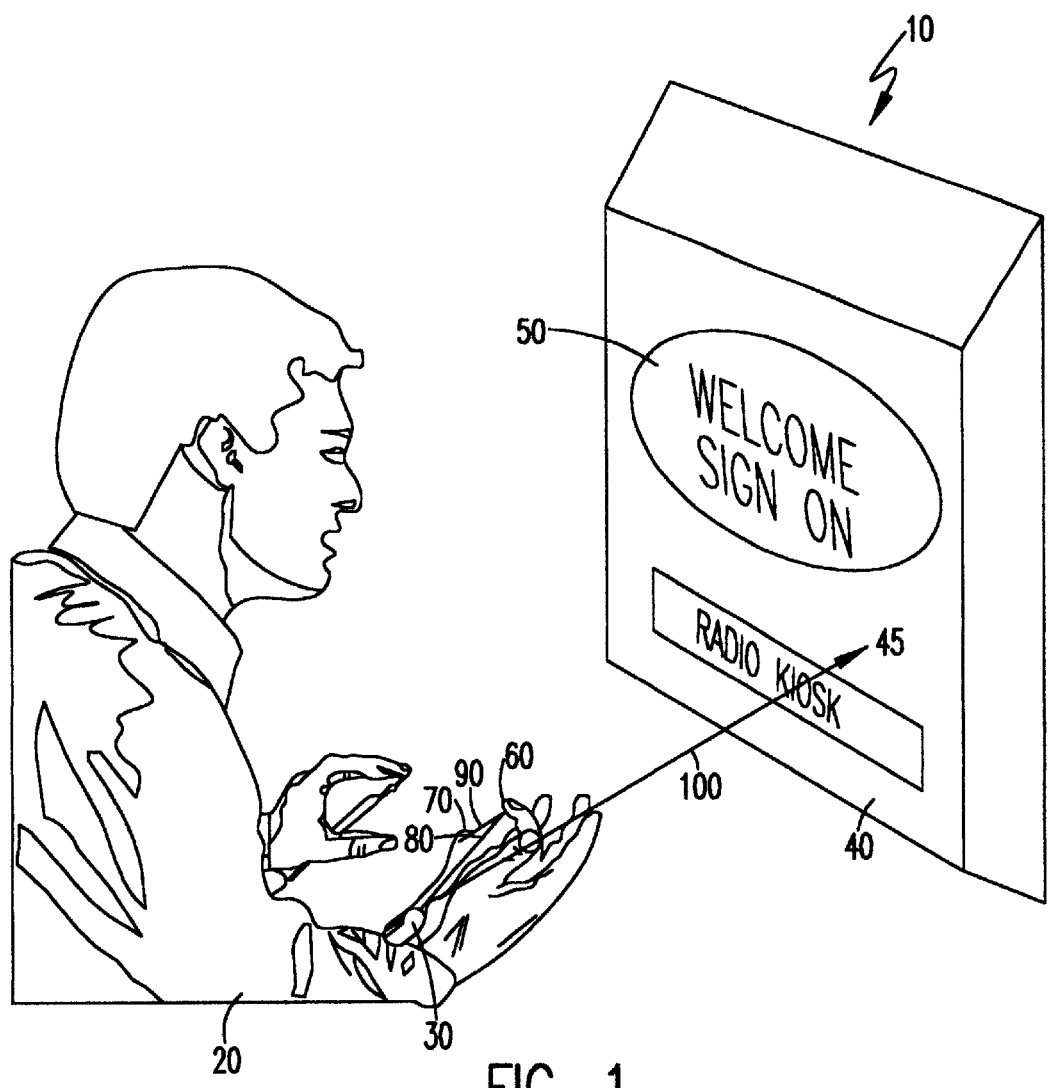
FIG. 1 is an illustrative application of the invention.

Referring now to the drawings, and more particularly to FIG. 1, there is shown an exemplary and generalized application of the invention 10. An operator 20 wears a small, lightweight housing 30 on at least one wrist or other convenient location on the body. The wrist is preferred as being proximate to the fingers which would ordinarily be used to operate a keyboard. However the invention may be adapted freely in accordance with its basic principles of operation as may be desired to accommodate the operator as a manner of convenience, physical handicap or the like. A controlled device 40 is provided and includes a sensor 45 for light or any other form of energy suitable for transmission of a coded signal such as, for example, sound, radio satellite or other wireless communication. The controlled device 40, hereinafter referred to as a base station for generality, preferably also includes some transducer 50 such as a display or an audio annunciator such as a beeper or speech synthesizer to confirm receipt of a coded signal 100 and recognition of its content.

As will be explained in greater detail below, light sources 31 (shown in FIG. 2), such as, for example, light emitting diodes or laser diodes operating in the infrared or optical range project well-defined beams of energy 80 over a limited solid angle generally parallel to the palm of the operator's hand. The solid angle 81 (shown in FIG. 2) of the beams is preferably limited such that the illuminated regions will not overlap at a distance from the housing 30 that is closer than the finger tips of the operator. It should be understood by those of ordinary skill in the art that the light source 31 may equally be a sound or radio wave source utilizing the same principles as described herein.

Thus, movement of a finger by the operator in a motion similar to pressing a key of a keyboard will cause the tip of the operator's finger to be illuminated by a beam 80. This illumination is reflected or scattered from the operator's fingertip 60 and detected by a sensor 73 which, in accordance with an embodiment of the invention currently preferred by the inventor for operation as a keyboard with a relatively large number of keys and illustrated in greater detail in FIG. 2, receives the reflected light 90 through one of a plurality of flexible optical fibers which are preferably bundled together as shown at 70 but terminated at different locations as will be further discussed in detail, below.

The optical fiber terminations include a surface shaping or other treatment 71 of the end of the optical fiber to limit the light acceptance angle and an inward curve 72 toward the operator's fingers so that the regions/cones of acceptance 91 of each of the respective fibers are directed generally orthogonal to the beams 80 and do not overlap within the dimensions of the operator's hand. However, the limited emission angle 81 of each of the light emitters 31 intersects with an acceptance cone of each of the optical fibers to provide a matrix of regions 61 which can be individually discriminated when an operator's finger or other object surface provides reflection or scattering of light at any such location.

Thus, by correlation of detected light with emitted light, the placement of any finger or other object at a location in a matrix where an emitted beam intersects an optical fiber cone of acceptance can be not only detected but differentiated from any other location in the matrix. Since the light sensors are already associated with respective ones of the optical fibers 70, it is only necessary to provide for discrimination among the beams of light 80 emitted by respective ones of the plurality of light emitters. When detected light 80 is reflected/scattered from a finger 60 and the matrix location discriminated, a coded signal 100 identifying that location is sent from housing 30 to base station 40. The coded light signal can be provided by one of the light emitters These communication links are summarized in FIG. 1A.

While it is preferred, for simplicity, to energize light emitters 31 in succession in a time-multiplexed fashion, it will be recognized that the beams 80 can be distinguished by other expedients such as frequency modulation or pulse width coding may be used and may also be preferable for speed of response (since either of these expedients would provide continuous monitoring of all actuable locations) or for application of the invention as a combinatorial keyboard such as may be found in stenographic apparatus and other devices where the number of selectable combinations exceeds the number of keys that are or can be provided (e.g. multiple shift keys such as "Ctrl" and "Alt" on a conventional or special purpose keyboard) or even where it is desirable to use the invention on only one of the operator's hands.

It should be recognized, however, that one actuable location in a particular cone of acceptance 91 of a single fiber can "shadow" another. However, this potential problem can be overcome by other expedients such as providing a second optical fiber bundle 70 on the opposite side of the operator's hand or performing "negative" detection by reflecting light from all emitters 31 from a surface simultaneously to all sensors 73 and preventing that reflection by interposition of a finger such as by touching that surface.

This type of problem does not arise in regard to actuable locations corresponding to the same light emitter 31 since the axis of light emission is generally parallel to a finger of the operator and two locations cannot, as a practical matter, be simultaneously actuated. However, combinations corresponding to a single emitter are usable, for example, by sequential actuation such as increasing the bend of the operator's finger to "slide" from one location to another or by moving the finger into the emitter beam generally parallel to the axis so that light is reflected or scattered to a plurality of optical fibers from different locations along the length of the operator's finger.

Optical communication link 100 may be provided by one or, preferably, more of the emitters 31 or by a separate emitter 32 provided for the purpose. Use of a separate emitter 32 or a plurality of emitters 31 can be arranged to provide greater communication power and a larger angle 82, 83 by which reliability is maximized and constraints of operator hand position are reduced. The signal on optical communication link 100 may be coded in any convenient manner and other details of the coding or the communication link are unimportant to the practice of the invention.

Figure 1A:
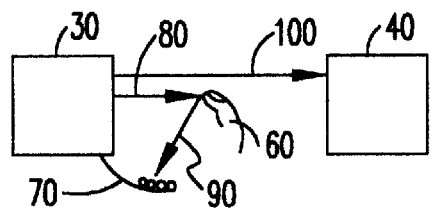
FIGS. 1A and 1B are schematic illustrations of optical communication paths in accordance with the invention.
Figure 1B:
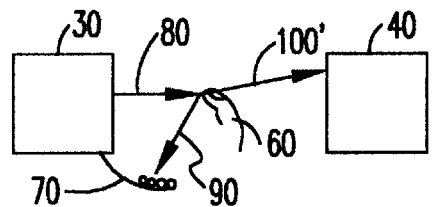

Alternatively, optical communication paths schematically depicted in FIG. 1B may be employed and may be advantageous and preferred in some applications. In the arrangement of FIG. 1B, beams 80 from emitters 31 is unchanged and may be multiplexed by time, frequency, pulse or pulse width coding or any other modulation technique such as spectral content. Light beam 80 is reflected or scattered from a finger 60 or other object and reflected or scattered light 90 is detected through, for example, fibers 70. However, in this case, further encoding or, more simply, further modulation corresponding to a particular fiber is imposed on light beam 80 and is scattered or reflected from the operator's finger or other object directly to base station 40 over path 100'. Communication power in light beam 80 may be increased to increase the power in link 100' upon detection of reflected or scattered light 90.

The arrangement of FIG. 1B provides at least several potential advantages over the arrangement of FIG. 1A. Specifically, the communication link 100' is substantially non-directional while the sensitivity of sensor 45 at base station 40 may be conveniently increased to a degree much greater than the dispersion of the signal by reflection or scattering from a finger in order to increase reliability of communications and to further and more fully reduce constraints of operator hand position, as well as providing improved support for combinatorial operation. Additionally, the arrangement of FIG. 1B allows encoding logic to be moved from housing 30 to base station 40 and for light sensing and modulation at the housing 30 to be greatly simplified (or omitted altogether) in the embodiment which will be discussed below in regard to FIG. 3.

Figure 2:
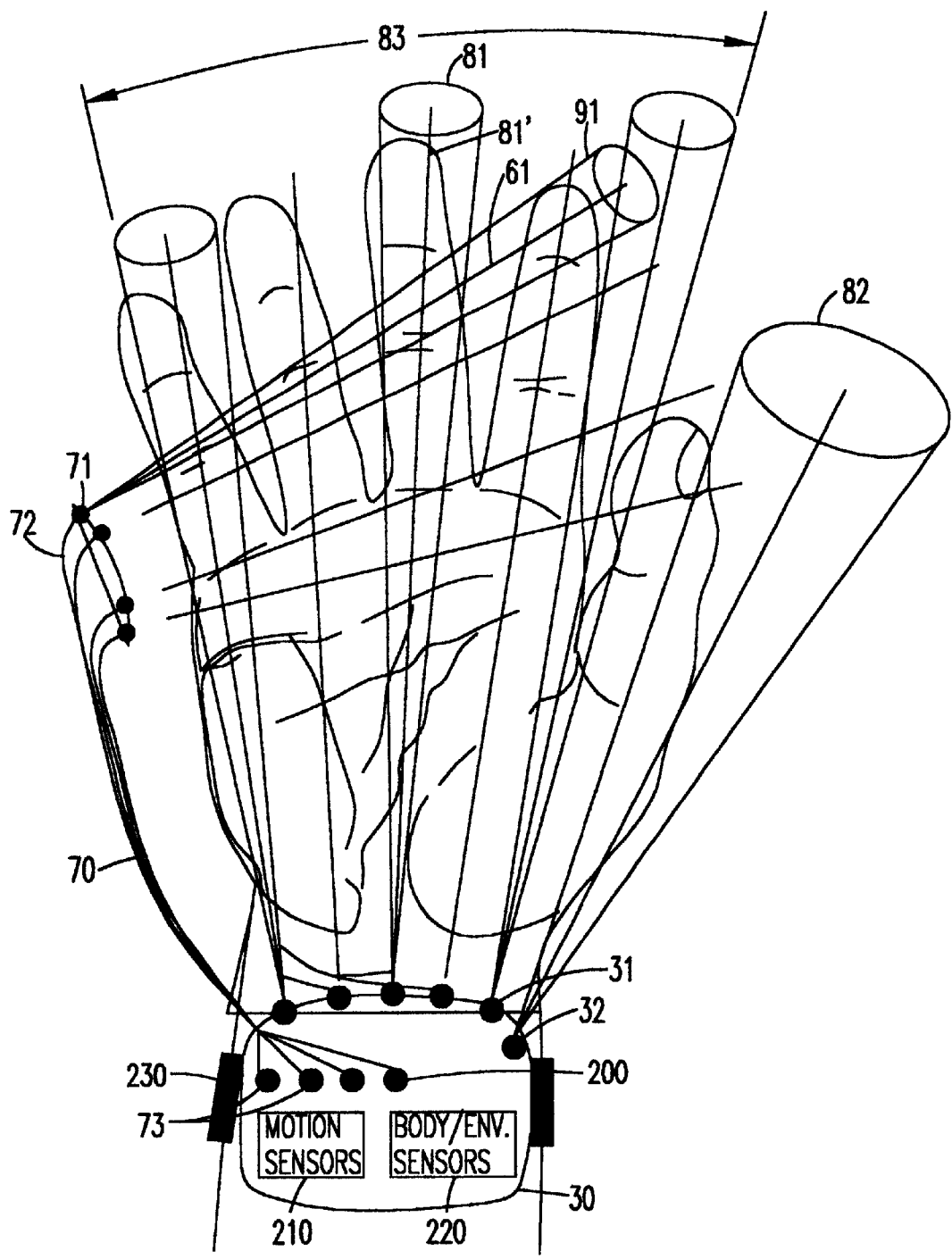
FIG. 2 illustrates the principal elements of a first embodiment of the invention.

Further in regard to FIG. 2, the preferred embodiment also includes a fiber sensor 200 which can be used to control the mode of operation (e.g. with or without a fiber optics bundle 70) and/or the type of fiber optics bundle which is used. In this regard, it should be understood that more or fewer fibers may be included in bundle 70 to provide more or fewer actuable locations and/or alter resolution or pitch of the actuable locations as may be desired for keyboard or other functions such as document or image scanning or bar code reading or various optical inspection procedures in connection with motion data provided by motion sensors 210 which might otherwise develop motion data to control a pointing device, as alluded to above or to signal confirmation or non-acceptance of an input (e.g. a short, quick motion to be interpreted in the manner of a mouse-click). The flexibility of fiber bundle 70 is particularly convenient in this regard and the configuration of the termination of the fibers can be coded and detected by fiber sensor 200 to control operational mode, decoding or encoding for transmission over optical link 100 and the like.

Also shown in FIG. 2 is a body and/or environmental condition sensor 220 which can collect additional information to be coded and transmitted to base station 40. Such a sensor could be used to provide monitoring of various physical conditions such as, for example, blood pressure, galvanic skin resistance, skin temperature, pulse or neuro-muscular signals of the user or to adapt the invention to accommodate any of a plurality of handicaps or requirements for convenience of use. The body sensor may also be used to confirm the identity of the user by exploiting biological signatures unique to each user. For illustrative purposes, but not to be limited thereto, these biological signatures may be retinal, fingerprint or thermal imaging based signatures. This sensor may also be adapted for use as a forced feedback system. Any environmental condition can be monitored such as temperature, humidity, atmospheric gas content pressure (e.g. for altitude or depth) or information derived through other systems such as a global positioning system (GPS) or chronometer and electro-magnetic sensors. It is considered that such information, provided over several channels for either or both hands, can simultaneously monitor either or both of ambient and/or operator conditions in a hostile environment and where the base station 40 may be required by those conditions to be relatively remote from the operator.

Figure 3:
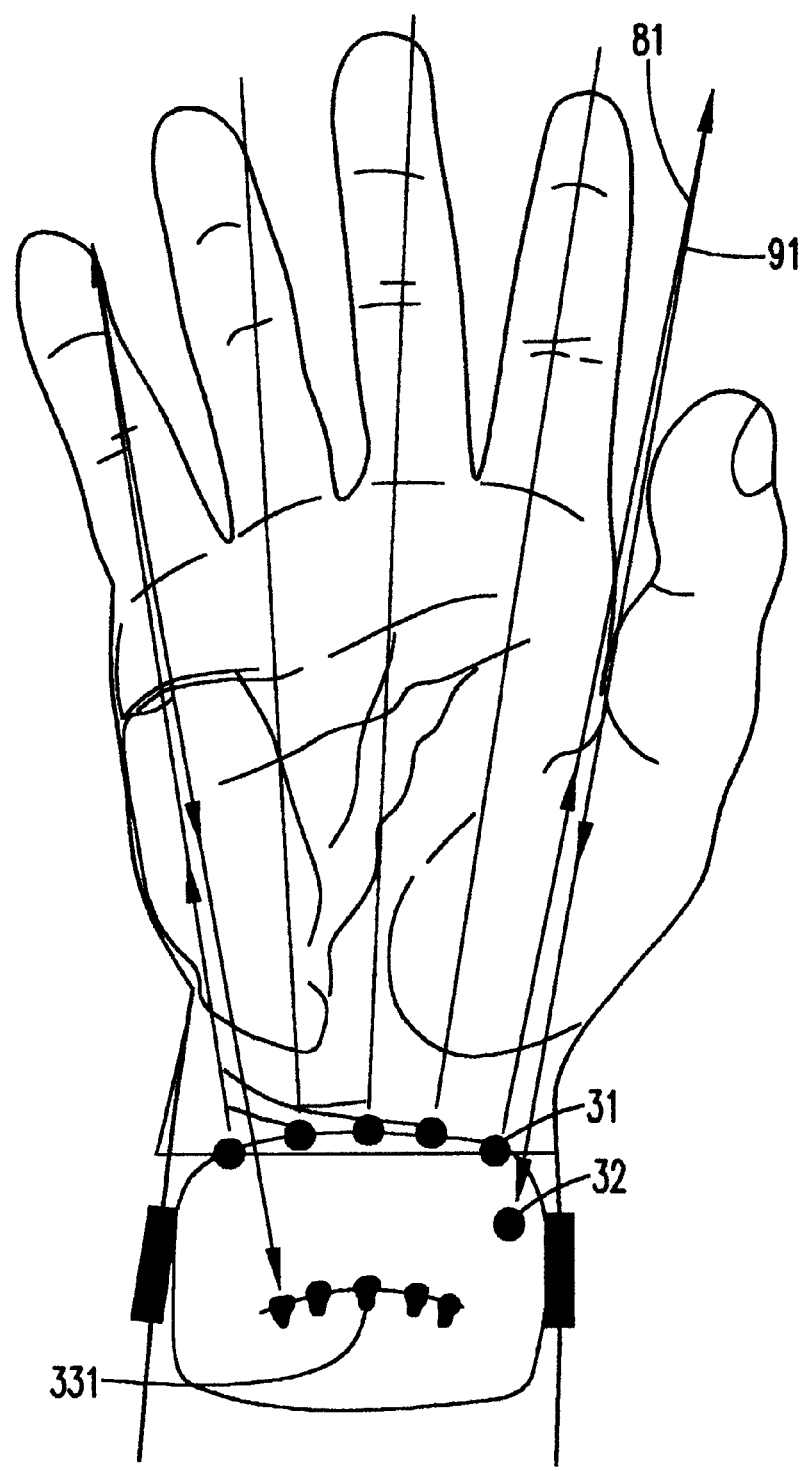
FIG. 3 illustrates the principal elements of a second embodiment of the invention.

Referring now to FIG. 3, a second embodiment of the invention will be described. The embodiment of FIG. 3 has only five "keys" or actuable regions and is useful particularly for control of relatively simple devices or data input in a combinatorial fashion. In this embodiment the fiber optic bundle is removed or omitted and the sensors 331 receive reflected or scattered light directly from the fingers of the operator or other objects. The sensors 331 may equally be adapted to receive radio or sound signals, much like the sensors contemplated for use in FIG. 2.

It should be noted that any or all of sensors 200, 210 and 220 may be included, as desired and that a possible mode of operation would be in a panning keyboard implementation as will be discussed in greater detail below in accordance with FIG. 6. Essentially, while only five "keys" or actuable locations or perhaps a few more corresponding, for example, to an increased range of thumb motion are provided for each hand, hand motion can alter the characters which are respectively represented by the respective actuable locations much in the manner in which hand position shifts slightly (e.g. between rows of a keyboard during typing) while actual finger motion is rendered substantially less critical and susceptible to operator error. It should also be appreciated that when the communication pattern of FIG. 1B are employed together with this embodiment of the invention (or the embodiment of FIG. 2 with the fiber optic bundle removed) communication path 90 could be omitted entirely and any further modulation imposed to develop signal 100' could be made directly responsive to motion sensor 210.

Figure 4:
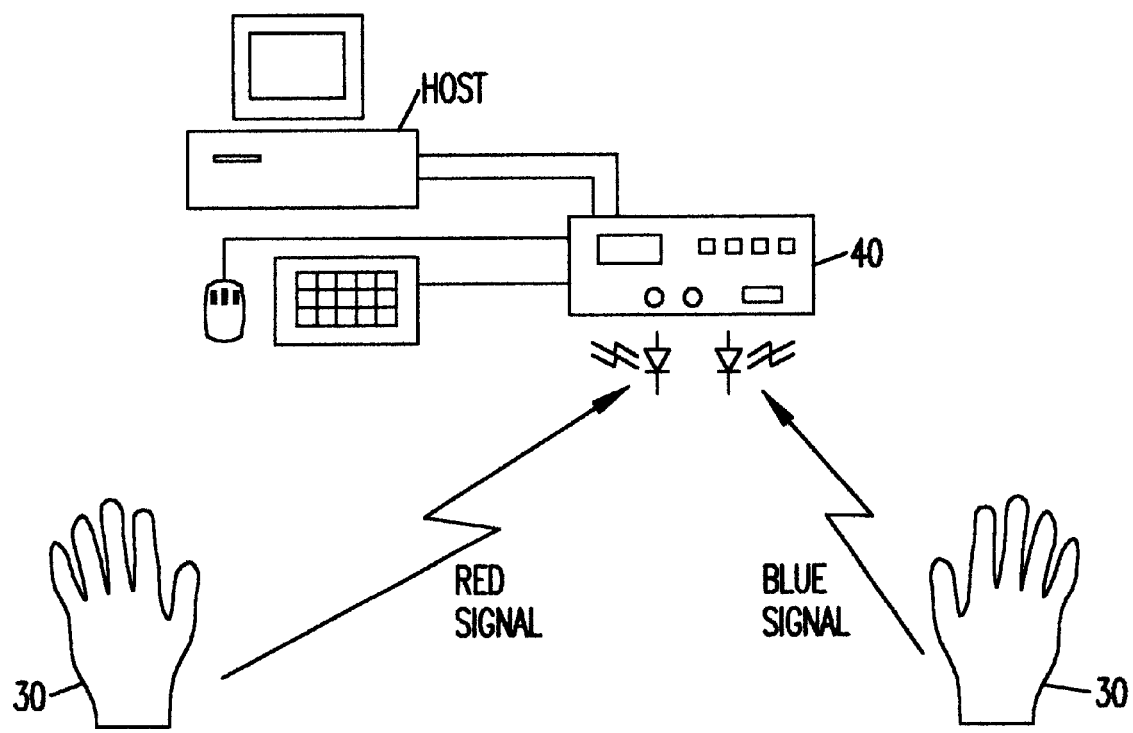
FIG. 4 is a schematic diagram of an application of the invention to a personal computer or other host device.

Referring now to FIG. 4, the optical communication arrangement in accordance with the invention will now be described. For the circumstance where the invention is applied to two or more parts of the operator's body, such as both wrists. It should be appreciated that the same principle would apply to a circumstance where two or more operators may wish to use the invention through the same base station concurrently. Such applications only require that optical link 100 or 100' support discrimination of each housing 30 simultaneously in use. This can be readily accomplished, for example, by spectral separation such as red and blue light, respectively, by polarization (e.g. horizontal, vertical or opposing diagonals) or coding, such as time division-multiple access (TDMA) or other coding. The particulars of any such arrangement or combination thereof is not at all critical to the practice of the invention.

Figure 5:
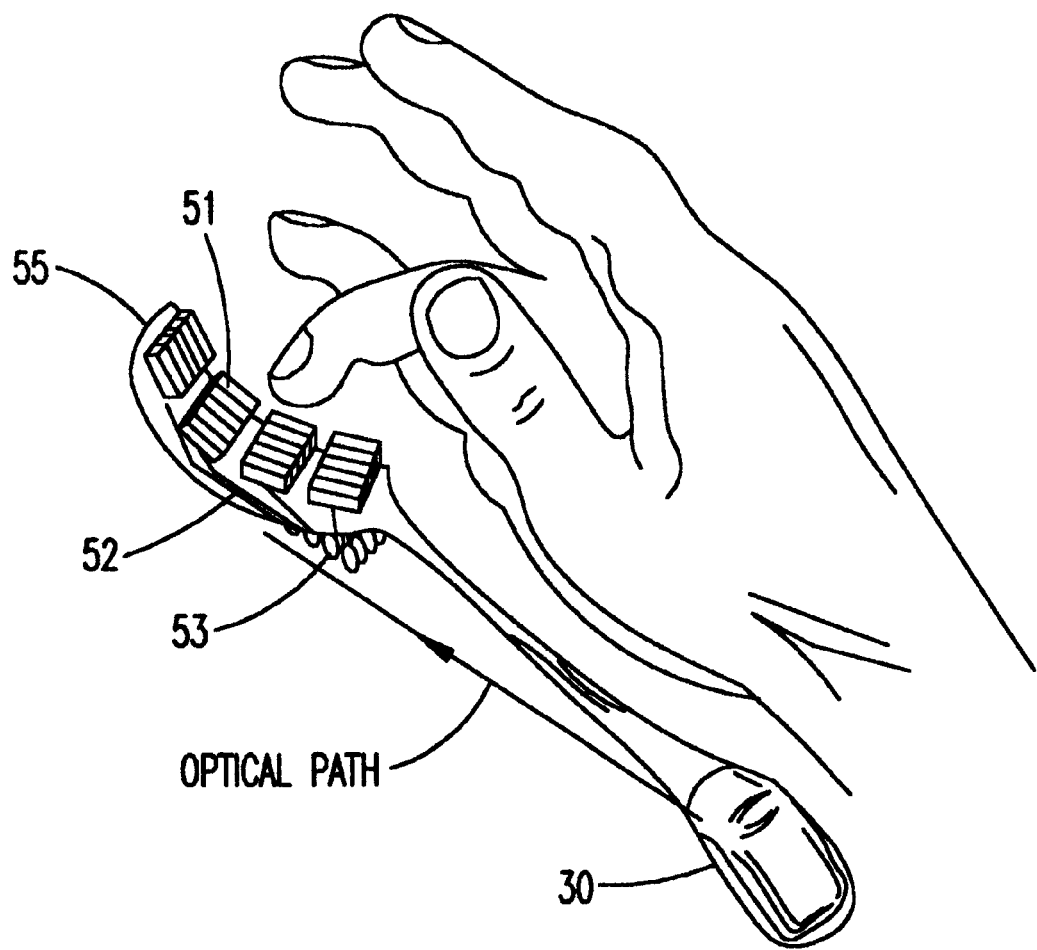
FIG. 5 is a passive optical keypad including the invention.

Referring now to FIG. 5, a passive optical keypad 50 usable in connection with the invention is shown. Such an arrangement may be useful for training in the use of the invention but also provides enhancements of the function thereof, as well. The passive keypad may be detachably mounted on housing 30, integrally formed therewith or separately attached to the operator with a strap 230 (FIG. 2) or other device similar to that used to attach housing 30 to the operator.

The passive keypad 50 supports a plurality of moveable keys 51 and a mirror array 53 preferably includes a small, moveable mirror for each moveable key. The mirror is moved into or out of the optical path through a linkage 52 when a corresponding moveable key 51 is pressed.

The use of mirrors and keys in this manner allows a greater number of keys to be provided for each hand without significantly diminishing the size or pitch of effective actuable locations which are now defined by the location, spacing and size of the moveable keys rather than the geometry of the light emitter and detector/receptor arrays, thus supporting easier and more accurate operation. The signal-to-noise ratio of the optical detection can also be improved and power requirements for illumination reduced by providing specular reflection of the illuminating beam.

Figure 6:
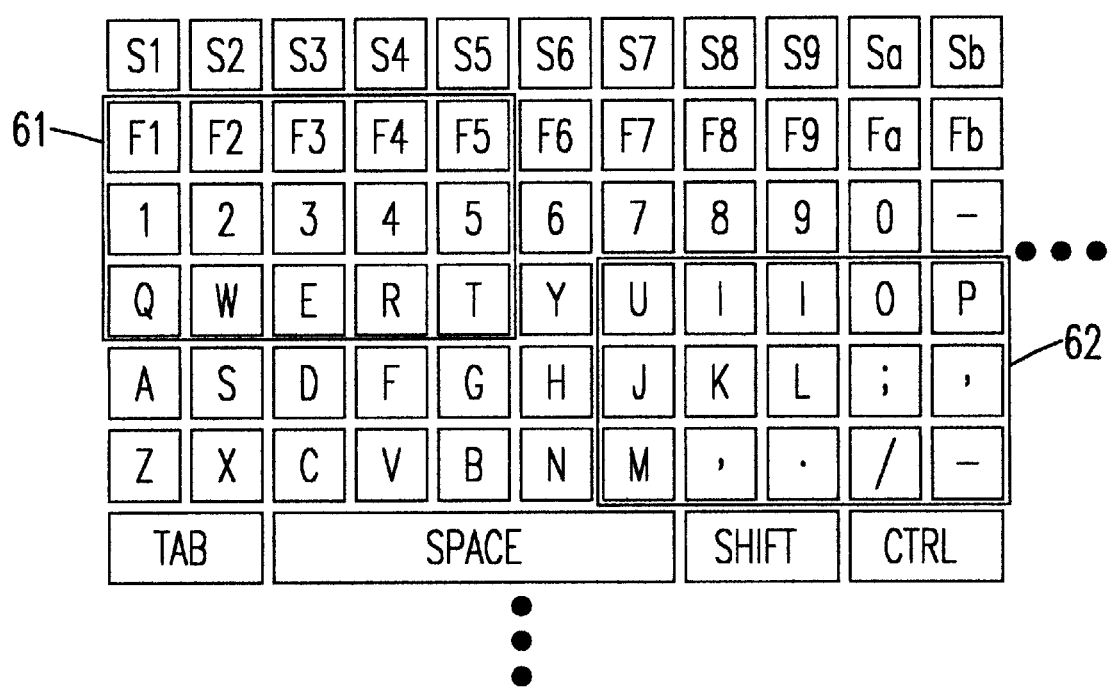
FIG. 6 illustrates application of the invention to a large matrix of selectable locations.

Referring now to FIG. 6, a panning key map mode of operation will now be explained. It will be recalled from the foregoing that for a given hand size and dexterity of the operator the pitch of actuable locations decreases with the number of actuable areas to be discriminated. While the potential increase in likelihood of erroneous operation may be partially ameliorated for large numbers of "keys" by the expedient of FIG. 5, discussed in detail above, for particularly large numbers of alternative selections to be accommodated while facilitating operation, it is preferred to provide somewhat fewer actuable locations such as the 3×5 array shown as compared with the 4×5 array of FIG. 2 but to display the entire array of alternative selections on display 50 (FIG. 1). Indicia 61, 62 are simultaneously displayed and are movable in response to hand motion data from sensor 210 to indicate the correspondence between the actuable location for each housing 30 concurrently in use with particular alternative selections in the entire virtual key map. The virtual keymap need not be displayed simultaneously in its entirety but can also be panned and scrolled in accordance with hand motion.

In view of the foregoing, it is seen that the invention provides a convenient and wearable alternate to conventional keyboards and which is readily adaptable to a plurality of widely varying applications and operator convenience. That is, the present invention is advantageously used in wireless communications between the user activated control and the base station such as an Internet kiosk, an automatic teller machine or the like. The operator, using the invention, may be identified, logged on and securely validated permitting transactions without requiring rote system interaction. A direct link with another operator is also contemplated via audio or video feeds or other data communication. Important additional useful functions are provided through use of a removable and flexible fiber optic bundle which may be of any of a number of different configurations. Additional functions are provided through provision of additional sensors and pointing device control and data entry functions are combined and integrated in numerous useful ways.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A system for providing an input signal to an apparatus over an electro-magnetic communication link, said system including a housing affixed to the wrist of an operator, a plurality of first electro-magnetic signal transmitters associated with said housing, at least one first electro-magnetic signal sensor at said housing, means for supplying distinctive signals to each of said plurality of first electro-magnetic signal transmitters such that distinctive electro-magnetic signals are emitted therefrom which can be distinguished from each other by the at least one sensor when reflected from a body portion of said operator or another object, a base station including a second electro-magnetic signal receiver, and means located at the housing for supplying distinctive signals responsive to said at least one first electro-magnetic signal sensor to said second electro-magnetic signal receiver.

2. The system of claim 1, wherein said electro-magnetic signal receiver and transmitters are a radio receiver and radio transmitters.

3. The system of claim 1, wherein said electro-magnetic signal receiver and transmitters are an optical receiver and optical transmitters.

4. The system of claim 3, wherein said optical transmitters are light emitting diodes or laser diodes.

5. The system of claim 4, wherein said light emitting diodes project well-defined beams of energy over a limited emission angle.

6. The system of claim 1, wherein said electro-magnetic signals are illuminating light emitted from said plurality of first electro-magnetic signal transmitters and said illuminating light is reflected or scattered from an operator's fingertip and detected by at least one said sensor.

7. The system of claim 1, further comprising means for transmitting said electro-magnetic signal from said first electro-magnetic signal transmitters to at least one said sensor.

8. The system of claim 7, further comprising a body condition sensor associated with said first electro-magnetic signal transmitters, wherein said body condition sensor collects operator bio-metric information to be transmitted to said base station as a said modified distinctive signal.

9. The system of claim 7, further comprising a body condition sensor associated with said first electro-magnetic signal transmitters, said body condition sensor exploiting biological signatures unique to each operator to confirm an identity of the operator.

10. The system of claim 7, further comprising an environmental condition sensor associated with said first electro-magnetic signal transmitters, wherein said environmental condition sensor collects environment information to be transmitted to said base station as a said modified distinctive signal.

11. The system of claim 1, wherein said electro-magnetic signal are optical signals, said plurality of first electro-magnetic signal transmitters are light-emitting diodes emitting said optical signals, and said transmitting means is at least one optical fiber.

12. The system of claim 11, wherein said at least one optical fiber is at least two optical fibers which terminate at different locations, and wherein said at least two optical fibers include optical fiber terminations to limit an acceptance angle of the optical signals.

13. The system of claim 12, wherein said at least two optical fibers have an inward curve toward an operators fingers such that regions of acceptance of each of said optical fibers are directed approximately orthogonal to the optical signals emitted form said light emitting diodes.

14. The system of claim 1, further comprising a transmission signal between said plurality of first electro-magnetic signal transmitters and said second electro-magnetic receiver, said transmission signal being associated with a matrix of regions which are individually discriminated when an operator's finger or other object provides reflection or scattering of said electro-magnetic signals at any such location, said matrix of regions being a correlation between well-defined beams emitted from said plurality of first electro-magnetic signal transmitters and respective regions of acceptance.

15. The system of claim 14, wherein said transmission signal is multiplexed by time, frequency, pulse or pulse width coding, or modulated.

16. The system of claim 14, further comprising a sensor to control a mode of operation of said base station.

17. The system of claims 16, wherein said sensor further decodes or encodes said transmission signal over a transmission link.

18. The system of claim 1, wherein said plurality of first electro-magnetic signal transmitters are light-emitters which are energized in a time-multiplexed fashion or a frequency modulation or pulse width coding.

19. The system of claim 1, further comprising a feedback responsive system associated with said first electro-magnetic signal transmitters, said feedback responsive system being responsive to an operator movement or input.

20. The system of claim 1, further comprising a motion sensor associated with said first electro-magnetic signal transmitters for detecting a motion of the operator.

21. The system of claim 1, wherein said second electro-magnetic receiver is capable of discriminating between two or more signals.

22. The system of claim 1, further comprising a keypad supporting a plurality of moveable keys and a mirror array, said keypad being mounted on said housing, said mirror array being moveable in and out of a transmission path when a corresponding moveable key is pressed.

* * * * *